Nov. 25, 1924.
J. ELLIS ET AL
1,516,592
SIDE CAR ATTACHMENT TO MOTOR CYCLES
Filed Oct. 3, 1922
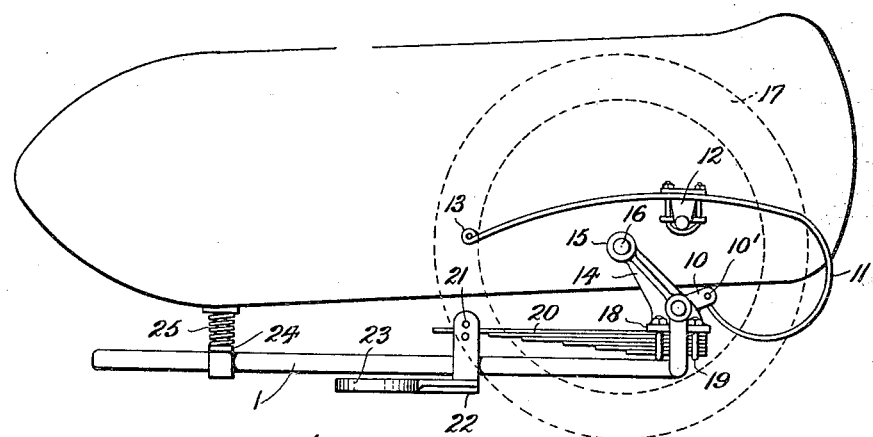
Fig. 1.
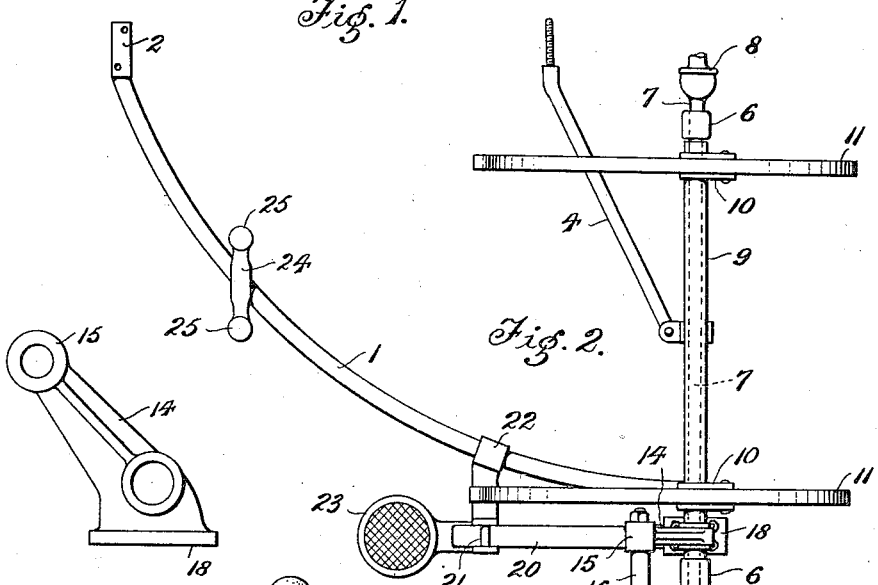
Fig. 2.
Fig. 4.
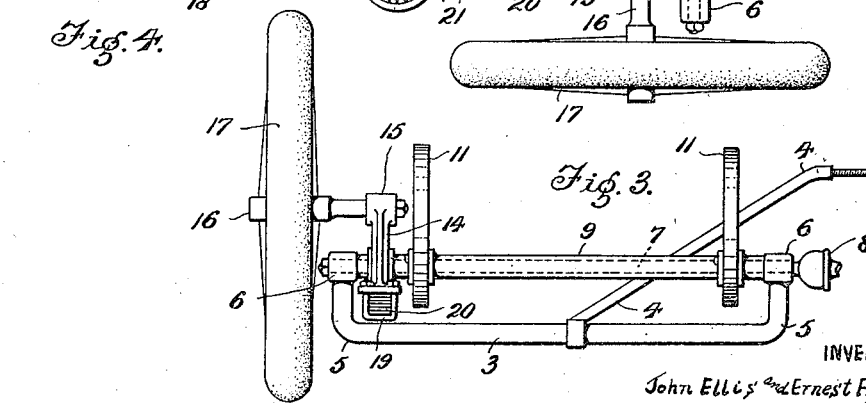
Fig. 3.
INVENTORS
John Ellis and Ernest F. Edward
By Richards Geier
Attys.

Patented Nov. 25, 1924.

1,516,592

UNITED STATES PATENT OFFICE.

JOHN ELLIS, OF ANNANDALE, NEAR SYDNEY, AND ERNEST FOSTER EDWARDS, OF BURWOOD, NEAR SYDNEY, NEW SOUTH WALES, COMMONWEALTH OF AUSTRALIA.

SIDE-CAR ATTACHMENT TO MOTOR CYCLES.

Application filed October 3, 1922. Serial No. 592,019.

*To all whom it may concern:*

Be it known that we, JOHN ELLIS, a subject of the King of Great Britain, residing at Annandale, near Sydney, in the State of New South Wales, Commonwealth of Australia, and ERNEST FOSTER EDWARDS, a subject of the King of Great Britain, residing at Burwood, near Sydney, in the State of New South Wales, Commonwealth of Australia, have invented new and useful Improvements in Side-Car Attachments to Motor Cycles, of which the following is a specification.

This invention relates to improvements in side-car attachments to motor-cycles and includes an improved resilient suspension for the side-car body whereby a greater degree of comfort will be obtained by the vehicle occupants whilst traversing uneven or irregular road surfaces.

It is an object of the invention to provide side-car attachments to motor-cycles incorporating an improved resilient suspension whereby shocks or jars imparted to the side-car wheel will be automatically taken up in a compensatory manner by a downward movement of the side-car body equivalent to the upward movement of the wheel.

A further object of the invention is to provide improved means whereby the unsprung weight is reduced to a minimum and the side-car wheel is constantly maintained in vertical parallel relationship with the motor-cycle, even when ruts are encountered and uneven roadways are being traversed so as to thereby prevent excessive and uneven wear on the tyres.

We attain the objects of this invention by the mechanism illustrated in the accompanying drawings, in which—

Figure 1 is a side elevation of the mechanism showing the side-car body in position.

Figure 2 is a plan of the side-car chassis with the body removed.

Figure 3 is a rear view of the side car chassis.

Figure 4 is a view of a detail.

The drawings illustrate the preferred form of the construction, but details may be modified with out departing from the ambit of the invention as defined by the claims.

The side-car chassis has a forwardly extending curved member 1 which is furnished at its front end with a suitable coupling member 2 for effecting ready attachment to the frame of a motor-cycle at a point in advance of the engine. The opposite or rear end of said curved member is securely fastened to a horizontal rear beam 3 of the chassis. This horizontal beam is connected by means of a diagonal stay 4 which extends to and is detachably secured to the saddle pillar of the motor-cycle. The end portions of the horizontal beam 3 are upwardly bent or curved at 5 and are provided with apertured bosses 6 fixedly receiving the opposite ends of a spindle 7 which is adapted for pivotal connection at its inner end to the frame of the motor-cycle by means of a ball and socket joint 8. These parts of the side-car chassis in combination are thus substantially stationary in relation to the motor-cycle frame.

Loosely mounted upon the spindle 7 between the apertured bosses 6 at the ends of the horizontal beam 3 is a tubular oscillating shaft or sleeve 9 having a pair of fixed brackets or arms 10 which are bifurcated at $10^1$ to receive the lower ends of the body suspension springs 11 which are affixed thereto. These springs are preferably of that type having a longitudinally curved portion with a semi-circular or C-shaped portion at its rearward end, and are anchored to the body of the vehicle by a shackle 12 and also forwardly thereof at the point 13.

Rigidly mounted at the outer end of the said tubular oscillating shaft is a two-way arm or lever 14 having at its upper end an apertured boss 15 in which the axle 16 of the side-car wheel 17 is fixedly mounted. The lower portion of the said lever 14 is provided with seating flanges 18 which are secured by means of U-shaped bolts 19 or other approved fastenings to the rear end of a laminated leaf spring 20, the opposite end of which latter is slidably engaged by and between a pair of roller bearings 21 which are mounted upon a bracket 22 secured to said forwardly curved member 1 of the side-car chassis. This bracket 22 also supports a step 23 which enables ready entry or descent to or from the side-car to be made by the occupants.

Mounted upon a plate 24 secured to said forwardly curved member 1 at a position intermediate of its opposite ends are vertically arranged suspension springs 25 which resiliently support the forward end portion of the side-car body.

During the use of the side-car, any concussive jar or shock imparted to the road wheel by irregularities of road surfaces causes the lever 14 wherein the wheel axle 16 is mounted, to move in an arc upwardly and rearwardly, thereby effecting partial rotation of the tubular shaft 9 and simultaneously exerting tension on the leaf spring 20 secured to the seating flanges 18 at the lower portion of said lever. This partial rotation of the tubular shaft causes the brackets 10 fixedly secured thereto to be moved downwardly, thereby lowering the point of connection of the longitudinally arranged suspension springs 11 to the chassis frame and automatically compensating for the upward movement of the side-car wheel.

After the irregularity in the road surface has been passed, the tension of the leaf spring 20 causes the various integers to be returned to their respective normal positions.

What we do claim is:

1. In a motor-cycle side-car chassis, shock-absorbing mechanism in which an oscilliatory sleeve is mounted on a relatively stationary part of the chassis and provided with arms extending in three directions for connection, respectively, to the body-suspension springs, to the axle of the side-car wheel, and to one end of a leaf spring having its opposite end mounted on a relatively stationary part of the chasis.

2. In a motor-cycle side-car chassis, shock-absorbing mechanism comprising a forwardly curved chassis member, a bearing supported by said curved member, an oscillatory sleeve mounted on a relatively stationary part of the chassis and provided with arms extending in three directions for connection, respectively, to the body-suspension springs, to the axle of the side-car wheel, and to the rear end of a leaf spring the forward end of which latter is slidably mounted in said bearing.

3. The combination in a motor-cycle side-car chassis of a forwardly extending and curved chassis member, a bearing supported by said member, a spindle adapted for pivotal connection to the cycle frame, an oscillatory sleeve on said spindle, arms on said sleeve for engagement with the curved lower ends of suspension springs, an arm on said sleeve accommodating the axle of the side-car wheel, and an arm on said sleeve to which a spring is clamped at one end and slidably supported at its opposite end by said bearing.

4. The combination in a motor-cycle side-car chassis of a forwardly extending and curved chassis member, a bracket carried by said member, a roller bearing supported by said bracket, a footstep on said bracket, forward suspension springs mounted on said chassis member, a spindle adapted for swivel connection to the cycle frame, a transverse chassis beam fixed to said spindle and to said curved member, a stay carried by said beam, an oscillatory sleeve on said spindle, arms on said sleeve for engagement with the lower curved ends of body-suspension springs, an arm rigid on said sleeve and accommodating the axle of the side-car wheel, and an arm on said sleeve in which a leaf spring is clamped at one end and slidably supported at its opposite end by said roller bearing.

In testimony whereof we affix our signatures in presence of two witnesses.

JOHN ELLIS.
ERNEST FOSTER EDWARDS.

Witnesses:
M. STARPELD,
D. S. GAUNSON.